Figure 1:
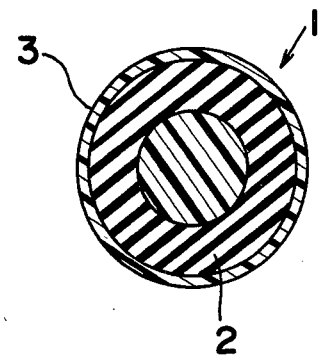

United States Patent [19]

Nakade et al.

[11] 4,272,079
[45] Jun. 9, 1981

[54] THREAD WOUND GOLF BALL

[75] Inventors: Shinichi Nakade, Itami; Michihiro Tanaka, Nishinomiya, both of Japan

[73] Assignee: Sumitomo Rubber Industries, Ltd., Hyogo, Japan

[21] Appl. No.: 78,826

[22] Filed: Sep. 25, 1979

[30] Foreign Application Priority Data

Oct. 2, 1978 [JP] Japan ................................. 53-121870

[51] Int. Cl.³ ........................ A63B 37/06; A63B 37/12
[52] U.S. Cl. ..................................... 273/225; 273/227; 273/235 R; 273/DIG. 022; 264/325
[58] Field of Search ................... 273/235 R, 225, 227, 273/DIG. 022, 220, 222, 223, 224, 217; 264/325

[56] References Cited

FOREIGN PATENT DOCUMENTS 1021424  3/1966  United Kingdom ..................... 273/225
1321270  6/1973  United Kingdom ................. 273/235 R

*Primary Examiner*—George J. Marlo
*Attorney, Agent, or Firm*—Birch, Stewart, Kolasch & Birch

[57] ABSTRACT

This invention is intended to provide a golf ball having good shot feeling and click properties, which is produced by impregnating a rubber thread-wound core with a latex containing within the range of 30 to 60% by weight the solid content of an Ionomer resin of ion-crosslinkages comprising mono-olefin and at least one unsaturated monocarboxylic or dicarboxylic acid or acid ester of three to eight carbon atoms, thereby to improve the integration between the core and the inner surface of the ball shell made of Ionomer resin of ion-crosslinkages to be covered over the latex covered core.

5 Claims, 4 Drawing Figures

THREAD WOUND GOLF BALL

The present invention relates to a thread-wound golf ball, and a method for manufacturing thereof. More particularly, the present invention is made to provide a golf ball which has improved playing properties such as providing a good shot feeling when being shot, as compared with conventional balls, and which comprises a ball shell made of an Ionomer resin having ion cross-linkages and a rubber thread-wound core formed by winding a rubber thread into a spherical core, the core being covered by and integrally connected to the ball shell to get a complete golf ball.

Generally, it is said that the quality of a golf ball for playing is often determined by several basic factors, the characteristics thereof depending upon the shot distance, stability of flight, control of direction, shot feeling, click, easiness to spin, and so on, in addition to the properties of durability and uniformity. In other words, each golf ball which has been mass-produced should have a standard of superior quality set up and established by authority measured by the above factors. In any event, a golf ball having excellent quality always presents good total playability, i.e., great all-around efficiency of playing such that the characteristics thereof are little influenced by a change of weather conditions occurring during playing, from the start of the game when the ball is driven from the tee to the end thereof when the ball is struck into the cup, during which the ball is hit by each kind of golf club. Accordingly, in the production of a golf ball within the factory, it is necessary to take into consideration all of the above-mentioned factors which effect efficiency, in order to impart excellent quality to the golf ball.

Conventionally, there have been proposed various types of design for the construction of a golf ball, among which the most popular one is the so-called thread-wound ball having a rubber thread-wound core buried within a ball shell and comprising a core and a rubber thread wound over the core. The core of the ball is formed as a center by a molded rubber ball or a bag filled with a paste of specific compositions and is then wound with a rubber thread under great tension so as to elongate the length tenfold as compared with the free size thereof, upon application of the required tension force thereon.

The rubber thread-wound core thus obtained is subsequently covered by a ball shell which is previously molded with resin. The method for covering of the ball shell normally comprises the steps in succession of molding with resin to provide a pair of halves of the ball shell, applying the halves of the ball shell onto the rubber thread-wound core to cover entirely the outer surface thereof, forming the outer shape of the ball shell by applying heat and a pressure onto the ball shell in the use of a press, painting and stamping. The resultant golf ball has on the outer surface a lot of dimples each having a suitable construction, being formed during the forming step of the shape of the ball shell, in order to provide desirable aerodynamic characteristics to the ball for playing.

With the above construction it is to be noted that the rubber thread-wound core of the golf ball serves as an important part of the resultant ball, having influence on the characteristics thereof in connection with the initial speed, shot distance, trajectory orbit, flight speed, and so on. However, since the rubber thread-wound core often has a defect in its resistance to damage against shocking or cutting, it is necessary to cover the rubber thread-wound core with the ball shell for the protection thereof, the rubber thread-wound core being integrally formed and connected with the ball shell. Accordingly, the ball shell covering over the rubber thread-wound core has a basic function of protecting the thread-wound core from damage when the golf ball is hit by a club. Conventionally, it has been developed to provide a golf ball having a homogeneous construction, being molded from a rubber-resin composition to form one ball in place of the above mentioned golf ball including the rubber thread-wound core, for the purpose of simplification of producing and lowering the cost thereof. This type of golf ball is normally called a "solid" golf ball, and is divided into two classes, that is, a one-piece ball which is singly formed of one unit by means of hardening solid rubber, and a two-pieces-ball comprising a core made by hardening solid rubber and a ball shell made of resin and the like for covering the core. However, since in practical use both of these "solid" golf balls have properties extremely inferior to the above mentioned golf ball including the rubber thread-wound core at the points of the flight property, impulse resilience, shot feeling, etc., they are merely used by small number of golfers, especially beginners, who often play in a manner were much depends upon the durability of a golf ball.

Accordingly, in spite of the fact that the golf ball having the rubber thread-wound core is generally easier to break or damage such as by shocking or cutting than is the "solid" golf ball, the former has attained the favor of or popular choice of most golfers because of the excellent qualities thereof relating to the flight property, impulse resilience, shot feeling and the like. Therefore, if there exists a ball shell for covering the rubber thread-wound core with the property of high strength, the resulting golf ball may be the best one in quality among golf balls.

However, the material of the ball shell is usually selected from the point of view of maintaining a balance between two factors, one that the material covered on the rubber thread-wound core have as good a resistance to cutting of the rubber thread-wound core as possible, and two that the material be required not to deteriorate the characteristics of the rubber thread-wound core relating to the flight property and impulse resilience. Generally, it is quite difficult to obtain a material which will fulfill the above two requirements. In fact, certain materials having a superior cut resistance often cannot be used in a practical sense as a material for producing a ball shell only because it is so hard so as to deteriorate the quality of the flight property and shot feeling of the manufactured golf ball.

Besides such qualities of a golf ball relating to the cut resistance, flight property and shot feeling, there is required another very important factor for determining the quality of a golf ball, that being the sound which is produced when a golf ball is being hit, referred to hereinafter as a click. Although the click is generally a quite subjective element to each person as well as shot feeling, each of which being a vivid description of the sound produced when a golf ball is hit by a club, there are certainly proper types of click and shot feeling which have been recognized by expert golfers as desirable and comfortable after years of experiences in playing golf.

Accordingly, to meet the requirements and preferences of golfers, it is essential to produce a golf ball having excellent quality in terms of the cut resistance, and flight while at the same time producing the desired effects as to shot feeling and click as determined by the experiences of experts.

The most popular material for producing a ball shell of a golf ball having excellent quality of the above-mentioned type which has been and is now used by a number of experts is a composition mainly comprising a natural or synthetic transpolyisoprene which is called "Balata", hereinafter referred to as the Balata. However, since the amount of production of the Balata is small all over the world and the price thereof is considerably high, the number of golf balls produced is limited to a certain extent.

Accordingly, for the purpose of improvement of resistance to cutting, simplification of production and lowering of producing cost, recently a golf ball covered with an Ionomer resin composition formed of a copolymer of ethylene and unsaturated monocarboxylic acid (cf. a golf ball disclosed in the Japanese Patent Publication No. 49-27093) has been developed to be provided for golfers.

However, the Ionomer resin covered golf ball does not meet the preference of eager golfers especially those who have mastered high level techniques and do not attach much importance to the durability of a golf ball. In spite of greatly improved resistance to cutting and excellent flight property, there is almost no example of a professional golfer using the Ionomer resin covered golf ball because the Ionomer resin covered golf ball has a different shot feeling when compared to the conventional Balata composition covered golf ball.

Accordingly, it is an essential object of the present invention to provide an improved Ionomer resin covered golf ball of the type referred to above, which is so improved as to exhibit a nice shot feeling and pleasing click, approaching as closely as possible the Balata covered golf ball, while maintaining excellent quality inherent to the conventional Ionomer resin covered golf ball in terms of qualities relating to the cut resistance, flight property and impulse resilience.

For achieving the above object of the present invention, a number of investigations and experiments have been made to discover that, in general, the shot feeling and click of the conventional Ionomer resin covered golf ball are greatly different from those of the Balata covered golf ball because of reasons as follows.

Firstly, since the Ionomer resin composition has a low fluidity in comparison with that of the Balata, the amount of Ionomer resin composition which penetrates into the gaps among the reticulate structure of rubber thread layers of the rubber thread-wound core is limited, when the rubber thread-wound core is directly covered by and molded with a ball shell made of an Ionomer resin composition and, therefore, the force for connecting between the rubber thread-wound core and the ball shell is weak. In addition thereto, since there is a problem relating to the qualities of the durability and cut resistance of the Ionomer resin covered golf ball when the ball is repeatedly hit, in spite of that the Ionomer resin has an excellent resistance to cutting by itself, the conventional Ionomer resin covered golf ball is always designed to have the thickness of a ball shell, about 1.8 mm, larger than the thickness of the Balata which is about 1.3 mm.

Secondly, it is well known that the surface of the conventional Ionomer resin covered golf ball is generally harder than that of the Balata covered golf ball. In employment of the conventional Ionomer resin covered golf ball and the Balata covered golf ball each providing with the rubber thread-wound core of the same material, the resultants listed within Table 1 were obtained upon experiment by measuring each real period of time during which a golf ball has been contacted by an implement for giving an impulse thereto when the former was hit by the latter. As shown in Table 1, there is a definite difference between the period of time during which a conventional Ionomer resin covered golf ball has been contacted by a hitting implement and the period of time during which the Balata covered golf ball has been contacted by a hitting implement. In other words, the periods of time for bringing the conventional Ionomer resin covered golf ball into contact with a hitting implement are considerably short as compared with those relating to the Balata covered golf ball.

TABLE 1

Period of time during which a golf ball has been contacted by an implement for giving an impulse to the golf ball. (weight of the implement for giving an impulse to the golf balls was 198.5 g, dimension of the contact time was $\mu$ sec. and speed of movement of implement for giving an impulse to the ball, 50 m/sec.)

| Kinds of balls | Balata covered golf ball | | | Conventional Ionomer resin covered golf ball | | |
|---|---|---|---|---|---|---|
| Compression of balls (Atti type) | 50 | 55 | 60 | 50 | 55 | 60 |
| Contact time | 438 | 468 | 496 | 420 | 436 | 453 |

Referring to click, the conventional Ionomer resin covered golf ball was found to give a hard and clear metallic sound in comparison with the Balata covered golf ball, which gives a light and exciting rubber sound which is favored by expert golf players.

The present invention is to provide a golf ball having a ball shell made of Ionomer resin composition with the improvement of shot feeling and click thereof which will approach as close as possible the shot feeling and click of the Balata covered golf ball, without deteriorating the excellent properties inherent to a conventional Ionomer resin covered golf ball in terms of resistance to cutting, flight property and impulse resilience, etc, by imparting firm connection between an Ionomer resin composition ball shell and a rubber thread-wound core.

The conventional Ionomer resin covered golf ball has been produced by directly applying a pair of halves of the ball shell to a rubber thread-wound core for covering thereof, each of said half shells being previously formed by Ionomer resin composition and placing the core and the ball shell into a mold so that they are integrally molded under heat and pressure into a golf ball.

However, the golf ball thus produced has the disadvantage that the connection between the Ionomer resin composition of the ball shell and the rubber thread-wound core, which is determined by the efficiency of the penetration of the Ionomer resin composition of the ball shell into the rubber thread-wound layers, is not sufficient, since an Ionomer resin composition has a flow fluidity compared with the Balata composition.

Accordingly, the present inventors have made a study of treatments for immersing a thread-wound core with various kinds of adhering polymeric materials for the purpose of improving connection between the Ionomer resin composition ball shell and the rubber thread-wound core. Through the study, it was found unexpectedly that immersing a thread-wound core in an Ionomer resin latex produces excellent properties in spite of the fact that an Ionomer resin per se has no adhering ability to rubber thread. The rubber thread-wound core treated with Ionomer resin latex is easily covered with a pair of half shells made of an Ionomer resin composition to provide a firm connection between the ball shells and the rubber thread-wound core, and they are integrally molded within a mold under heat and pressure into a golf ball, whereby a golf ball thus produced shows excellent properties.

More particularly, a golf ball according to the present invention is produced by immersing a rubber thread-wound core, within latex containing 30 to 60% by weight of solid content of Ionomer resin composition comprising a mono-olefin and at least one unsaturated monocarboxylic or dicarboxylic acid having from three to eight carbon atoms, and further comprising an unsaturated monocarboxylic or dicarboxylic acid ester, with which the Ionomer resin composition has an ion crosslinkage, and then the latex penetrated rubber thread-wound core is dried. Subsequently, a pair of half shells of a ball shell are applied to cover all of the outer surface of the thread-wound core treated with the latex to form one unit which is placed within a mold under heat and pressure to be molded integrally into a golf ball, said ball shell being made of an Ionomer resin composition mainly containing an Ionomer resin comprising mono-olefin and at least one unsaturated monocarboxylic or dicarboxylic acid having from three to eight carbon atoms, and further comprising an unsaturated monocarboxylic or dicarboxylic acid ester, with which the Ionomer resin has an ion crosslinkage.

As is clear from the foregoing description, a golf ball of the present invention has a construction comprising a rubber thread-wound core formed by winding an elongated rubber thread into a ball, a ball shell of Ionomer resin composition applied onto the surface of the rubber thread-wound core for covering thereof, and latex containing solid content of Ionomer resin composition placed between the rubber thread-wound core and the ball shell such that the solid content of the latex penetrates into the reticulate structure of the rubber thread-wound core to be integrally adhered thereto and to be integrally connected to the inner surface of the ball shell for covering the rubber thread-wound core, said ball shell comprising mono-olefin and at least one unsaturated monocarboxylic or dicarboxylic acid having from three to eight carbon atoms, and further comprising an unsaturated monocarboxylic or dicarboxylic acid essterr, with which the Ionomer resin has an ion crosslinkage, and said latex having a composition mainly containing Ionomer resin comprising mono-olefin and at least one unsaturated monocarboxylic or dicarboxylic acid having from three to eight carbon atoms, and further comprising an unsaturated monocarboxylic or dicarboxylic acid ester, with which the Ionomer resin has an ion crosslinkage.

The improved characteristics of the golf ball related with the present invention can also achieved by an alternative method other than that above mentioned, one in which a rubber thread-wound core is coated with an Ionomer resin thick layer by repeating the immersion of the rubber thread-wound core in the Ionomer resin latex until the desired coating thickness is achieved. After drying the coated rubber thread-wound core is directly molded under heat and pressure without the application of a pair of halves of the ball shell formed beforehand.

A series of tests have been performed to demonstrate that the golf ball of the present invention has an improved resistance to cutting as expected, since the united force of connection between the Ionomer resin covering and the rubber thread-wound core has been greatly increased. Furthermore, it has been unexpectedly found that the shot feeling and click of a golf ball of the present invention are respectively substantially enhanced and closely approach those of the Balata composition covered golf ball. From the results of the foregoing tests, it has been firmly regarded that the shot feeling and click of a golf ball are substantially influenced by how the covering material of the ball shell and the rubber thread-wound core are integrated with each other by the united force therebetween.

Since the united force of connection between the Ionomer resin covering and the rubber thread-wound core of the golf ball of the present invention has been greatly improved by treating the latter with the Ionomer resin latex, it became possible to reduce the thickness of the covering and to use as a covering material an Ionomer resin composition of a type which is softer and has a low resistance to cutting. Accordingly, a golf ball can be obtained showing the shot feeling and click characteristic quite similar to those of the Balata composition covered golf ball while maintaining excellent resistance to cutting inherent to an Ionomer resin composition covered golf ball. In addition thereto, it became possible to improve further flight property of an Ionomer resin composition covered golf ball by reducing the thickness of the Ionomer resin covering which results in increase of diameter of the rubber thread-wound core.

The Ionomer resin latex employed in the present invention contains 30 to 60% by weight of solid content of Ionomer resin comprising a mono-olefin and an unsaturated monocarboxylic or dicarboxylic acid and further comprising a unsaturated monocarboxylic or dicarboxylic acid ester as a third component, depending on necessity, with which the Ionomer resin has an ion crosslinkage.

The composition of the Ionomer resin latex may contain only an ordinary Ionomer resin latex or may contain another natural or synthetic rubber latex or a synthetic resin latex mixed with the ordinary Ionomer resin latex at any rate, and preferably, at a rate of less than 40% by weight of solid content of the Ionomer resin latex composition.

In addition to the above-mentioned components, a thickening agent such as a carboxylated methylcellulose in an amount of 20% by weight of the solid content of the latex and preferably, less than 10% by weight thereof may be added, if necessary, the degree of viscosity thereof being adjusted beforehand.

The rubber thread-wound core is immersed within the above-mentioned latex from 5 to 600 seconds and preferably, from 20 to 300 seconds, and then the excess latex attached to the core is shaken off with there remaining a sufficient amount thereof for covering the entire surface of the rubber thread-wound core. Subsequently, the rubber thread-wound core covered by the Ionomer resin latex is placed on a suitable table to be dried by wind for more than three hours. It should be noted that the latex may be sprayed onto the rubber thread-wound core or brushed thereon instead of immersing the thread-wound core in the latex. It should be also noted that the period of time for drying the latex after being attached to the rubber thread-wound core may be shortened by drying the same by heated wind having a temperature at which deterioration of the rubber thread is not promoted, for example, up to 50° C.

As is clear from the foregoing description, a golf ball of the present invention is manufactured by immersing a rubber thread-wound core, formed by winding a rubber thread into a ball, within a vessel of the latex to allow the latter to impregnate the former so that the solid matter of the latex penetrate into the reticulate structure of the rubber thread-wound core to be integrally adhered thereto, whereby the unity force of connection between the rubber thread-wound core and the latex covering for protecting the surface thereof can be improved, said latex containing 30 to 60% by weight of solid content of an Ionomer resin comprising a mono-olefin and at least one unsaturated monocarboxylic or dicarboxylic acid having from three to eight carbon atoms, and further comprising an unsaturated monocarboxylic or dicarboxylic acid ester with, which the Ionomer resin has an ion crosslinkage.

Figure 2:
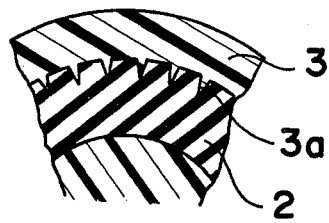
Figure 3:
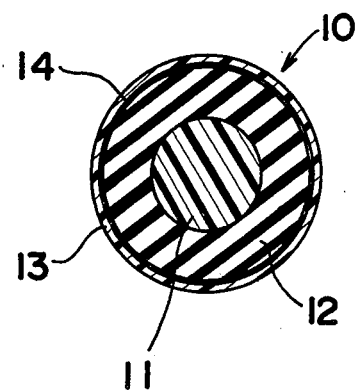
Figure 4:
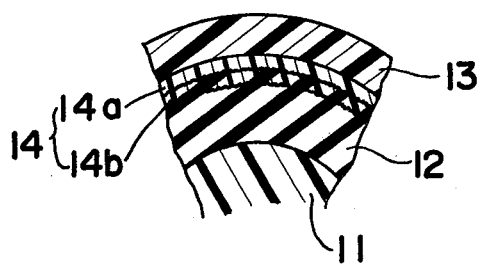

These and other objects and features of the present invention will become apparent from the following detailed description taken in conjunction with the preferred embodiments thereof with reference to the accompanying drawings in which;

FIG. 1 is a cross-sectional view of a conventional golf ball as referred to above, FIG. 2 is a cross-sectional view showing a portion of FIG. 1, on an enlarged scale, FIG. 3 is a cross-sectional view of a golf ball according to the present invention, and FIG. 4 is a cross-sectional view showing a portion of FIG. 3, on an enlarged scale.

A conventional golf ball 1 comprises a rubber thread-wound core 2 and a ball shell 3 made of Ionomer resin composition which is formed of a copolymer of ethylene and unsaturated monocarboxylic acid, as shown in FIG. 1. Such a golf ball having a ball shell 3 made of Ionomer resin composition is produced in a manner that a rubber thread-wound core 2 is covered by the ball shell 3 and, then, both of them are integrally molded under heat and pressure into one unit, resulting in the melted Ionomer resin composition penetrating into the reticulate structure 3a of the rubber thread-wound core 2, as shown in FIG. 2, to form a bridge for the connection between them. This method has been also employed for producing Balata composition covered golf ball.

However due to a lower fluidity of Ionomer resin composition in comparison with one of the Balata, the amount of Ionomer resin composition to be penetrated into gaps among the reticulate structure of the rubber thread-wound core is smaller than one of Balata composition in the Balata composition covered golf ball.

As a result, the force for connecting between the rubber thread-wound core and the ball shell is weak in the Ionomer resin composition covered golf ball.

Referring to FIG. 3, showing a construction of a golf ball 10 according to the present invention, the golf ball 10 comprises a center 11 constituted by a solidified hard rubber or a bag filled with a paste of specific composition, a rubber thread-wound core 12 formed by winding a rubber thread of a high quality into a ball, applying the tension required to elongate such a thread tenfold as compared with the free size thereof, and a coating of ball shell 13 previously formed in a pair of half shells of a ball shell and stuck to each other for covering the rubber thread-wound core 12. The coating 13 mainly comprises an Ionomer resin composition of mono-olefin and at least one unsaturated monocarboxylic or dicarboxylic acid having from three to eight carbon atoms, and further comprises an unsaturated monocarboxylic or dicarboxylic acid ester, said Ionomer resin having an ion crosslinkage with the ester component.

A latex 14 existing between the rubber thread-wound core 12 and the coating 13 for connection therebetween contains 30 to 60% by weight of solid content of an Ionomer resin comprising a mono-olefin and at least one unsaturated monocarboxylic or dicarboxylic acid and further comprising an unsaturated monocarboxylic or dicarboxylic acid ester.

The golf ball 10 according to the present invention is manufactured by the steps of immersing the rubber thread-wound core 12 in the latex 14, drying the latex 14, applying a coating onto the surface of the rubber thread-wound core 12 for covering thereof, and molding the coating 13 by applying heat and pressure so that the rubber thread-wound core 12 and the coating 13 are integrally connected to each other through the latex 14. Within the golf ball 10 thus manufactured there results, as shown within FIG. 4, two kinds of new layers 14a, 14b between the rubber thread-wound core 12 and coating 13 by means of the latex 14, i.e., one layer 14a mixed and melted with the coating 13 and latex 14 and the other layer 14b of the penetrated and melted latex 14 into the rubber thread-wound core 12, threby producing a united force for the connection between the rubber thread-wound core 12 and coating 13 so as to present the firm-fleshed body of the golf ball 10.

It is to be noted that the Ionomer resin latex 14 having been dried and molded within the rubber thread-wound core 12 and ball shell 13 becomes substantially the same material as that of the ball shell to bring forth the united force of the connection between the rubber thread-wound core 12, ball shell 13 and latex 14. The latex penetrates the reticulate structure of the rubber thread-wound core 12 and is melted into the body of the ball shell 13 by heating during the molding process. In other words, although the latex 14 of itself has almost no capacity of adhering force, the dried and molded latex 14 mixes with the body of the ball shell 13 and fills the reticulate structure of the rubber thread-wound core 12 upon the penetration thereinto to bridge the gap between the rubber thread-wound core 12 and ball shell 13, as it were, to form one unit.

Actual methods of manufacturing the golf ball 10 having the above-mentioned construction of the present invention will be described hereinbelow with reference to various examples thereof.

EXAMPLE 1

A rubber thread-wound core for use in a high-grade golf ball formed by winding a rubber thread of a high quality into a ball having a diameter of 39.20 mm on average is immersed in "Corporen latex", an Ionomer resin latex, which is a trade name owned and sold by ASAHI-DOW LIMITED of Japan, and having 40% of solid content and a viscosity of 100 cp, for thirty seconds, and then excessive latex adhered to the surface of the rubber thread-wound core is removed by shaking therefrom, and the rubber thread-wound core covered by the Ionomer resin latex is quietly placed on a metal woven mesh at temperature of about 25° C. for twenty four hours. The amount of the Ionomer resin latex adhered to the surface of the rubber thread-wound core was about 0.3 g.

Subsequently, a pair of half shells having soft Ionomer resin composition, more particularly, composition containing Surlyn 1856, Evaflex 260 and TiO$_2$ at proportion of 90 to 10 to 2 by weight, respectively, which composition having a Shore D hardness of 50, are applied to the surface of the rubber thread-wound core for covering thereof, and the rubber thread-wound core covered with the pair of half shells is heated to be molded into a golf ball under normal conditions for molding an Ionomer resin covered golf ball. The golf ball thus molded is then coated with paint applied to the surface of the ball shell. The golf ball, sample 1, thus finished according to the present invention has an average diameter of 41.20 mm and an average weight of 45.2 g, while a reference of the conventional golf ball, reference 1, which was produced without being immersed in latex, has an average diameter of 41.21 mm and an average weight of 45.2 g.

Various kinds of tests have been performed on these balls and also on other reference balls 2 and 3, which reference 2 being the Balata composition covered standard golf ball comprising a rubber thread-wound core of the same material as used in the Ionomer resin covered golf ball, having an average diameter of 39.65 mm, and a reference 3 being an Ionomer resin composition covered standard golf ball, having a rubber thread-wound core of an average diameter of 38.70 mm, which composition containing Surlyn 1601 and TiO$_2$ at a proportion of 100 to 2 by weight and having a Shore D hardness of 65.

It is clearly seen from Table 2 that the shot feeling and click of the golf ball of the present invention are similar to those of the reference 2 and resistance to cutting thereof is improved in comparison with the reference 1 since the rubber thread-wound core of the golf ball of the present invention is treated in latex.

EXAMPLE 2

Another golf ball of the present invention, sample 2 is obtained by the same procedure as mentioned within the Example 1, except that a mixture of 90 parts of an Ionomer resin latex by weight and 10 parts of a polyisoprene latex by weight, which is Maxprene IR-900 manufactured and sold by Seitetsu Kagaku Kogyo Co., Ltd. of Japan, containing 65% of solid content and having a viscosity of 100 cp, is used as an immersion liquid into which a rubber thread-wound core is immersed. The results of capacity tests on the golf balls are also shown in Table 2.

EXAMPLE 3

A further golf ball of the present invention, sample 3 is obtained by the same procedure as mentioned in the Example 1, but a mixture of 90 parts of Ionomer resin latex by weight and 10 parts of polybutadiene latex by weight, which is JSR 0700, manufactured and sold by Nippon Synthetic Rubber Industries Co., Ltd. of Japan, containing 57% of solid content and having a viscosity of 250 cp, is immersed. The results of tests to determine capacity thereof are also shown in Table 2.

EXAMPLE 4

A still further golf ball of the present invention, sample 4 is obtained by the same procedure as mentioned in Example 1, but a mixture of 90 parts of Ionomer resin latex by weight and 10 parts of NBR latex by weight, which is NBR latex of Hycar 1551, manufactured and sold by Nippon Zeon Co., Ltd. of Japan containing 50% of solid content and having viscosity of 40 cp is used as an immersion liquid in which a rubber thread-wound core is immersed. The results of tests to determine capacity of the golf ball are also shown in Table 2.

EXAMPLE 5

Another further golf ball of the present invention, sample 5 is obtained by the same procedure as mentioned in Example 1, but a mixture of 90 parts of Ionomer resin latex by weight and 10 parts of modified carboxylic SBR latex, which is JSR 0668, manufactured and sold by Nippon Synthetic Rubber Industries Co., Ltd. of Japan, containing 48% of solid content and having a viscosity of 45 cp is used as immersion liquid in which a rubber thread-wound core is immersed. The results of tests to determine capacities of the golf ball are also shown in Table 2.

EXAMPLE 6

A still another golf ball of the present invention, sample 6 is obtained by the same procedure as mentioned in Example 1, but hard Ionomer resin composition being employed within the reference 3 of a standard conventional type is used as a coating material for covering the rubber thread-wound core. The results of tests to determine capacities of the golf ball are also shown in Table 2.

EXAMPLE 7

A still another further golf ball of the present invention, sample 7 is obtained by the same procedure as mentioned in Example 1, but a hard Ionomer resin used in Example 6 is used as a coating material for covering the rubber thread-wound core, and a rubber thread-wound core having an average diameter of 38.70 mm is used as a rubber thread-wound core. The results of tests to determine capacities of the golf ball are also shown in Table 2.

It is clearly seen from Table 2 that each sample ball from 1 to 7 of the present invention has a flight distance substantially the same with that of a conventional Balata composition covered ball, i.e., reference 2 and shot feeling and click greatly approached to those of a Balata composition covered ball through period of time during which the ball is touched with a club is rather short. Furthermore, each Ionomer resin composition covered golf ball of the present invention, samples 1 to 7, has an improved resistance to cutting compared with conventional Ionomer resin covered balls of references 1 and 3.

Although the present invention has fully been described in connection with the preferred embodiment thereof, it is to be noted that various changes and modifications will be apparent to those skilled in the art. Therefore, such changes and modifications are to be understood as included within the true scope of the present invention.

TABLE 2

Performance comparison of golf balls

| Kinds of golf balls | Compression of balls (Atti type) | Results of hitting tests performed by professional golfers*1 | | Contact hour (Compression of balls: 55) (μ sec.)*2 | Results of tests for resistance to cutting*3 |
| --- | --- | --- | --- | --- | --- |
| | | Shot distance (m) | "shot feeling and click" | | |
| Balls of the present invention | | | | | |
| Example 1 | 50 to 60 | 218 | quite similar to Reference 2 | 451 | not broken |
| Example 2 | 50 to 60 | 217 | quite similar to Reference 2 | 450 | not broken |
| Example 3 | 50 to 60 | 216 | quite similar to Reference 2 | 453 | not broken |
| Example 4 | 50 to 60 | 215 | quite similar to Reference 2 | 450 | not broken |
| Example 5 | 50 to 60 | 217 | quite similar to Reference 2 | 452 | not broken |
| Example 6 | 50 to 60 | 215 | similar to Reference 2 | 448 | not broken |
| Example 7 | 50 to 60 | 216 | similar to Reference 2 | 440 | not broken |
| Conventional balls | | | | | |
| Reference 1 | 50 to 60 | 217 | undesirable | 441 | broken |
| Reference 2 (Balata composition covered ball) | 50 to 60 | 215 | desirable | 468 | broken |
| Reference 3 | 50 to 60 | 216 | undesirable | 436 | not broken |

*1 The ball was shot by a driver for seven times on trial, excepting mis-shots.
*2 An implement for giving an impulse to the ball, 198.5 g by weight, was struck against the ball at a speed of 50 m/sec.
*3 A knife edge, being about 600 g by weight, was struck against the ball at a speed of 20 m/sec.

What is claimed is:

1. A golf ball which comprises a rubber thread-wound core having coated on the surface thereof such that it penetrates the reticulate structure thereof an ionomer resin latex comprising 30 to 60% by weight of solid content of an ionomer resin composition comprising a mono-olefin and at least one unsaturated monocarboxylic or dicarboxylic acid having from three to eight carbon atoms having an ion crosslinkage with an unsaturated monocarboxylic or dicarboxylic acid ester, and a ball shell which covers the surface of the coated thread-wound core such that it is integrally bonded thereto, said ball shell coating comprising an ionomer resin comprising a mono-olefin and at least one unsaturated monocarboxylic or dicarboxylic acid having three to eight carbon atoms having an ion crosslinkage with an unsaturated monocarboxylic or dicarboxylic acid ester.

2. A golf ball which comprises a rubber thread-wound core having coated on the surface thereof such that it penetrates the reticulate structure of the thread-wound core an ionomer resin latex comprising 30 to 60% by weight of solid content of an ionomer resin composition comprising a mono-olefin and at least one unsaturated monocarboxylic or dicarboxylic acid having from three to eight carbon atoms having an ion crosslinkage with an unsaturated monocarboxylic or dicarboxylic acid ester, said coating being present at a sufficient thickness to effect the desired ball diameter.

3. The golf ball disclosed in claims 1 or 2 wherein the resulting ball has an average diameter of about 41.20 mm.

4. A method of manufacturing a golf ball which comprises:
   (a) immersing a rubber thread-wound core, formed by winding a rubber thread into a ball, into an ionomer resin latex comprising 30 to 60% by weight of solid content of an ionomer resin composition comprising a mono-olefin and at least one unsaturated monocarboxylic or dicarboxylic acid having three to eight carbon atoms having an ion crosslinkage with an unsaturated monocarboxylic or dicarboxylic acid ester,
   (b) removing and drying the rubber thread-wound core thus impregnated with the latex resin,
   (c) applying a pair of preformed half shells so as to cover the entire surface of the latex impregnated rubber thread-wound core to form a single unit, said shell compositions comprising an ionomer resin comprising a mono-olefin and at least one unsaturated monocarboxylic or dicarboxylic acid having three to eight carbon atoms, having an ion crosslinkage with an unsaturated monocarboxylic or dicarboxylic acid ester; and
   (d) applying heat and pressure to the resulting configuration so as to produce an integrally molded golf ball.

5. A method of manufacturing a golf ball which comprises:
   (a) immersing a rubber thread-wound core, formed by winding a rubber thread into a ball, into an ionomer resin latex comprising 30 to 60% by weight of solid content of an ionomer resin composition comprising a mono-olefin and at least one unsaturated monocarboxylic or dicarboxylic acid having three to eight carbon atoms having an ion crosslinkage with an unsaturated monocarboxylic or dicarboxylic acid ester, until the desired coating thickness of the resin is built up on the surface of the core to effect the desired ball diameter,
   (b) removing and drying the resulting coated rubber thread-wound core thus impregnated with the latex resin, and
   (c) applying heat and pressure to the resulting ball configuration so as to produce a golf ball wherein the core is integrally adhered to the outer shell.

* * * * *